United States Patent
Newman et al.

(10) Patent No.: US 11,398,850 B2
(45) Date of Patent: Jul. 26, 2022

(54) RAPID DOPPLER CORRECTION FOR MOBILE V2X COMMUNICATION IN 5G/6G

(71) Applicants: David E. Newman, Palos Verdes, CA (US); R. Kemp Massengill, Palos Verdes, CA (US)

(72) Inventors: David E. Newman, Palos Verdes, CA (US); R. Kemp Massengill, Palos Verdes, CA (US)

(73) Assignee: ULTRALOGIC 6G, LLC, Palos Verdes Estates, CA (US)

(*) Notice: Subject to any disclaimer, the term of this patent is extended or adjusted under 35 U.S.C. 154(b) by 0 days.

(21) Appl. No.: 17/526,192

(22) Filed: Nov. 15, 2021

(65) Prior Publication Data

US 2022/0131573 A1 Apr. 28, 2022

Related U.S. Application Data

(60) Provisional application No. 63/114,168, filed on Nov. 16, 2020, provisional application No. 63/117,720, (Continued)

(51) Int. Cl.
*H04B 7/01* (2006.01)
*H04W 72/04* (2009.01)
(Continued)

(52) U.S. Cl.
CPC ............ *H04B 7/01* (2013.01); *G01S 5/0027* (2013.01); *G01S 5/0054* (2013.01); *H04L 1/0003* (2013.01); *H04W 16/28* (2013.01); *H04W 52/08* (2013.01); *H04W 52/225* (2013.01); *H04W 52/282* (2013.01); *H04W 52/283* (2013.01); *H04W 52/285* (2013.01); *H04W 64/00* (2013.01); *H04W 64/003* (2013.01); *H04W 64/006* (2013.01); *H04W 72/02* (2013.01);
(Continued)

(58) Field of Classification Search
CPC ....... H04W 24/02; H04W 4/02; H04W 4/027; H04W 4/46; H04W 52/282; H04W 52/285; H04W 72/02; H04W 72/0453; H04W 72/048; H04L 2027/0026; H04L 1/0003; H04B 7/01
See application file for complete search history.

(56) References Cited

U.S. PATENT DOCUMENTS

| | | | |
|---|---|---|---|
| 6,167,268 A | 12/2000 | Souissi | |
| 6,593,880 B2 | 7/2003 | Velazquez | |
| 8,254,281 B2 | 8/2012 | Hadad | |
| 8,520,695 B1 * | 8/2013 | Rubin | G08G 1/096791 370/445 |

(Continued)

FOREIGN PATENT DOCUMENTS

WO 2017184190 10/2017

*Primary Examiner* — Brian T O Connor
(74) *Attorney, Agent, or Firm* — Mayer & Williams PC

(57) ABSTRACT

Disclosed are systems and methods in 5G and 6G, for compensating frequency shifts caused by the relative motion of a transmitter and receiver. For communication between a mobile user device and a base station, protocols can provide that the messages received by the base station comply with a predetermined channel frequency. Further protocols can provide that a mobile user device may transmit and receive messages at the same frequency. For sidelink communication, protocols can provide that peer devices can either transmit or receive at a predetermined channel frequency, greatly assisting reception of the messages.

18 Claims, 11 Drawing Sheets

Related U.S. Application Data filed on Nov. 24, 2020, provisional application No. 63/118,156, filed on Nov. 25, 2020, provisional application No. 63/274,221, filed on Nov. 1, 2021, provisional application No. 63/276,139, filed on Nov. 5, 2021, provisional application No. 63/276,745, filed on Nov. 8, 2021, provisional application No. 63/278,578, filed on Nov. 12, 2021.

(51) Int. Cl.
| | | |
|---|---|---|
| *H04L 1/00* | (2006.01) | |
| *H04W 72/02* | (2009.01) | |
| *H04W 52/28* | (2009.01) | |
| *H04W 64/00* | (2009.01) | |
| *G01S 5/00* | (2006.01) | |
| *H04W 16/28* | (2009.01) | |
| *H04W 52/08* | (2009.01) | |
| *H04W 52/22* | (2009.01) | |
| *H04W 28/02* | (2009.01) | |
| *H04W 92/18* | (2009.01) | |

(52) U.S. Cl.
CPC ..... *H04W 72/048* (2013.01); *H04W 72/0453* (2013.01); *H04W 72/0473* (2013.01); *H04W 28/0268* (2013.01); *H04W 52/228* (2013.01); *H04W 92/18* (2013.01)

(56) References Cited

U.S. PATENT DOCUMENTS

| | | | |
|---|---|---|---|
| 10,749,582 B2 * | 8/2020 | Forenza | H04B 7/0456 |
| 11,228,880 B2 * | 1/2022 | Aldana | H04W 28/22 |
| 2003/0125046 A1 | 7/2003 | Riley | |
| 2005/0272379 A1 * | 12/2005 | Rotta | H04B 7/18513 455/67.11 |
| 2007/0021122 A1 | 1/2007 | Lane | |
| 2010/0124212 A1 | 5/2010 | Lo | |
| 2011/0238286 A1 | 9/2011 | Roesser | |
| 2013/0287080 A1 | 10/2013 | Li | |
| 2014/0302872 A1 | 10/2014 | Lane | |
| 2017/0208600 A1 | 7/2017 | Hsu | |
| 2018/0083730 A1 | 3/2018 | Gulati | |
| 2018/0138963 A1 | 5/2018 | Hernando | |
| 2018/0206075 A1 | 7/2018 | Demirdag | |
| 2018/0279246 A1 | 9/2018 | Gan | |
| 2019/0222239 A1 * | 7/2019 | Fox | H04W 64/006 |
| 2019/0222302 A1 | 7/2019 | Lin | |
| 2019/0281561 A1 | 9/2019 | Sawai | |
| 2019/0335445 A1 * | 10/2019 | Forenza | H04B 7/024 |
| 2019/0342841 A1 | 11/2019 | Wu | |
| 2020/0120458 A1 * | 4/2020 | Aldana | H04W 4/08 |
| 2020/0186236 A1 | 6/2020 | Wang | |
| 2020/0296710 A1 | 9/2020 | Logothetis | |
| 2020/0367067 A1 | 11/2020 | Haley | |
| 2021/0029653 A1 | 1/2021 | Zhang | |
| 2021/0136700 A1 | 5/2021 | Arad | |
| 2021/0385755 A1 | 12/2021 | Zavesky | |

* cited by examiner

RAPID DOPPLER CORRECTION FOR MOBILE V2X COMMUNICATION IN 5G/6G

PRIORITY CLAIMS AND RELATED APPLICATIONS

This application claims the benefit of U.S. Provisional Patent Application Ser. No. 63/114,168, entitled "High-Power Transmission of Priority Wireless Messages", filed Nov. 16, 2020, and U.S. Provisional Patent Application Ser. No. 63/117,720, entitled "Automatic Frequency Correction for Wireless Mobile Communications", filed Nov. 24, 2020, and U.S. Provisional Patent Application Ser. No. 63/118, 156, entitled "Automatic Frequency Correction for Wireless Mobile Communications", filed Nov. 25, 2020, and U.S. Provisional Patent Application Ser. No. 63/274,221, entitled "Rapid Doppler Correction for Mobile V2X Communication in 5G/6G", filed Nov. 1, 2021, and U.S. Provisional Patent Application Ser. No. 63/276 139, entitled "Location-Based Power for High Reliability and Low Latency in 5G/6G", filed Nov. 5, 2021, and U.S. Provisional Patent Application Ser. No. 63/276,745, entitled "AI-Based Power Allocation for Efficient 5G/6G Communications", filed Nov. 8, 2021, and U.S. Provisional Patent Application Ser. No. 63/278,578, entitled "Location-Based Beamforming for Rapid 5G and 6G Directional Messaging", filed Nov. 12, 2021, all of which are hereby incorporated by reference in their entireties.

FIELD OF THE INVENTION

Low-complexity procedures for correcting Doppler frequency shifts in communications between vehicles and other wireless entities are disclosed.

BACKGROUND OF THE INVENTION

For optimal reception, wireless messages in 5G and 6G are generally intended to be received at a particular frequency. If the transmitter is moving toward or away from the receiver, the as-received signal is frequency shifted (Doppler shifted) relative to the transmitted frequency. Such frequency errors can result in degradation of message quality, reduction in noise immunity, and interference or crosstalk with messages on adjoining subcarriers. What is needed is means for correcting motional frequency errors in mobile wireless communications.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a method for a mobile user device to communicate with a base station of a wireless network, the method comprising: determining, by the mobile user device, a location of the base station, a location of the mobile user device, a speed of the mobile user device, and a direction of travel of the mobile user device; determining, by the mobile user device, a channel frequency associated with the base station; calculating, by the mobile user device, a Doppler frequency shift associated with wireless communication between the mobile user device and the base station, the Doppler frequency shift being proportional to the channel frequency and proportional to the speed of the mobile user device and proportional to a cosine of an angle between the direction of travel of the mobile user device and a direction toward the base station from the mobile user device; and transmitting, by the mobile user device, to the base station, a first wireless message at a first frequency.

In another aspect, there is a base station of a wireless network, in signal communication with a mobile user device, the base station configured to: determine a channel frequency related to a channel of the base station; determine a frequency shift related to a motion of the mobile user device; receive a first message, from the mobile user device, at the channel frequency; and transmit a second message, to the mobile user device, at the channel frequency minus two times the frequency shift.

In another aspect, there is a method for a first mobile user device to communicate with a second mobile user device, the method comprising: determining, by the first mobile user device, a sidelink channel frequency allocated for wireless communication between user devices; determining, by the first mobile user device, a location, a speed, and a direction of travel of the first mobile user device; receiving, by the first mobile user device, from the second user device, a message specifying a location, a speed, and a direction of travel of the second mobile user device; calculating, by the first mobile user device, based at least in part on the location, speed, and direction of travel of the second mobile user device, a frequency shift proportional to the sidelink channel frequency.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

Like reference numerals refer to like elements throughout.

DETAILED DESCRIPTION

Figure 1A:
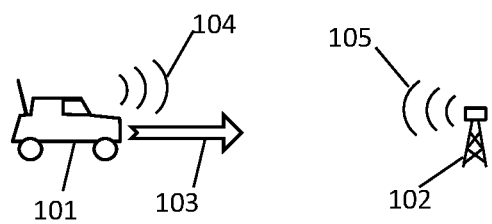
FIG. 1A is a schematic showing an exemplary embodiment of a mobile user device communicating with a base station, according to some embodiments.

Disclosed herein are systems and methods for correcting frequency errors in 5G and 6G wireless communications, and particularly for rapidly and automatically correcting frequency shifts caused by relative motion between the receiver and transmitter. Systems and methods disclosed herein (the "systems" and "methods", also occasionally termed "embodiments" or "arrangements", generally according to present principles) can provide urgently needed wireless communication protocols to adjust transmitter and/or receiver frequencies to account for Doppler shifts from motion of the transmitter or receiver or both, according to some embodiments. Versions include low-complexity protocols accommodating reduced-capability user devices, rapid protocols suitable for high-performance user devices, and versatile protocols for sidelink communications between user devices in motion.

In many wireless systems, optimal reliability may be obtained when each message is received at a particular, pre-defined frequency which is anticipated by the receiver. For example, at a base station, multiple signals may be received in closely-spaced frequency bands termed "subcarriers", each signal being encoded in OFDM (orthogonal frequency-division multiplexing) which provides a degree of isolation or separation between adjacent subcarriers. However, if a message arrives with a frequency shift, deviating from the assigned subcarrier frequency, the OFDM orthogonality is reduced and message interference or faulty demodulation or other errors may result. Frequency errors may also allow signals in adjacent subcarriers to partially mix, further degrading message quality, particularly in non-OFDM communication. Such frequency errors may be due to Doppler-effect frequency shifts caused by one of the entities being in motion relative to the other.

The Doppler effect is a frequency shift caused by relative motion between the transmitter and the receiver. For example, if the transmitter is approaching the receiver, and the transmitted frequency is $f_0$, the receiver will receive the signal at a higher frequency $f_0+df$, that is, frequency shifted by an amount $df$. If the transmitter is moving away from the receiver, the frequency shift $df$ is negative and the resulting frequency as-received is lower than the transmitted frequency. As mentioned, these frequency errors can degrade the orthogonality between OFDM messages, leading to subcarrier crosstalk, demodulation faults, and the like. For example, in a cell with multiple user devices traveling in different directions or speeds, each message transmitted from each moving transmitter will be Doppler shifted by a different amount when received at the base station, resulting in different frequency distortions of each message. Examples below show how a user device and a base station, or other communicating entities, may arrange to cancel the effects of Doppler shifts in wireless messaging.

Terms herein generally follow 3GPP (third generation partnership project) standards, but with clarification where needed to resolve ambiguities. As used herein, "5G" represents fifth-generation and "6G" sixth-generation wireless technology. A network (or cell or LAN or local area network or the like) may include a base station (or gNB or generation-node-B or eNB or evolution-node-B or access point) in signal communication with a plurality of user devices (or UE or user equipment or terminals) and operationally connected to a core network (CN) which handles non-radio tasks, such as administration, and is usually connected to a larger network such as the Internet. Embodiments may include direct user-to-user ("sidelink") communication such as V2V (vehicle-to-vehicle) communication, V2X (vehicle-to-anything), X2X (anything-to-anything, also called D2D or device-to-device) and base station communications or V2N (vehicle-to-network). Here, "vehicle" is to be construed broadly, including any mobile wireless communication device. The time-frequency space is generally configured as a "resource grid" including a number of "resource elements", each resource element being a specific unit of time termed a "symbol time", and a specific frequency and bandwidth termed a "subcarrier" (or "subchannel" in some references). Each subcarrier can be independently modulated to convey message information. Thus a resource element, spanning a single symbol in time and a single subcarrier in frequency, is the smallest unit of a message. Each modulated resource element of a message is referred to as a "symbol" in references, but this may be confused with the same term for a time interval. Therefore, each modulated reference element of a message is referred to as a "message element" in examples below. A "demodulation reference" is a set of modulated resource elements that exhibit levels of a modulation scheme (as opposed to conveying data) and each resource element of a demodulation reference is referred to a "reference element" herein. A message may be configured "time-spanning" by occupying sequential symbols at a single frequency, or "frequency-spanning" on multiple subcarriers at a single symbol time (also called "frequency-first" if the message continues on multiple symbol times). "CRC" (cyclic redundancy code) is an error-checking code. "RNTI" (radio network temporary identity) is a network-assigned user code. "QoS" is quality of service, or priority. "QCI" (QoS class identifier) defines various performance levels. A message is "unicast" if it is addressed to a specific recipient, and "broadcast" if it includes no recipient address. Transmissions are "isotropic" if they provide roughly the same wave energy in all horizontal directions. A device "knows" something if it has the relevant information. A device "listens" or "monitors" a channel or frequency if the device receives, or attempts to receive, signals on the channel or frequency. A message is "faulted" or "corrupted" if one or more bits of the message are altered relative to the original message. A "channel frequency" is a frequency of a particular subcarrier, such as the central subcarrier, of a frequency band or channel, allocated by the base station, that includes one or more subcarriers. A "synchronization signal block" (SSB) and a "first system information block" (SIB1) are system information messages that a network transmits to new user devices. A "vector" is a mathematical entity having a magnitude and a direction. For example, velocity is a vector quantity in which the speed equals the vector magnitude, and the direction of motion is the direction of the vector. As used herein, the term "substantially equal" means "equal to within a predetermined fraction", and the predetermined fraction is in the list of 1%, 5%, 10%, and 20% unless otherwise specified.

The systems and methods include a first version termed "base-preferred" for communications between a mobile user device and a base station, in which the base station transmits and receives messages at the same frequency, while the mobile user node is required to transmit and receive at different frequencies. The systems and methods further include a second version termed "mobile-preferred" in which the mobile user device (such as a vehicle) transmits and receives messages at the same frequency, while the base station transmits and receives at different frequencies. The systems and methods further include a third version termed "none-preferred" because it requires both communicating entitles to transmit and receive at different frequencies. The systems and methods further include message formats by which mobile user devices may indicate their location and speed and direction, to base stations or other user devices, and thereby to enable mutual correction of Doppler frequency shifts.

A motivation for the "base-preferred" version may be that a base station generally receives multiple messages from different user devices simultaneously, on multiple closely-spaced subcarriers. The base station can separate those messages if they all remain tightly within their allotted subcarriers. But if some of the user devices are in motion (and fail to correct their transmission frequencies as provided below), some of the messages may be received with frequency offsets, thereby greatly increasing the difficulty of separating the various messages. Therefore, base stations may prefer a protocol that places the burden of correcting the Doppler shifts onto the mobile user devices, so that the base station can receive the messages in the frequency bins expected.

A motivation for the "mobile-preferred" version may be that mobile user devices are generally far less capable of advanced signal processing than the base station. Typically, base stations include high-speed processors and advanced software. A reduced-capability user device may have difficulty performing the adjustments and protocols required for the base-preferred protocol. Therefore, the user device may request the mobile-preferred version which allows a simpler transmit and receive procedure.

A motivation for the "none-preferred" version may be that peer-to-peer or sidelink communication generally involves user devices transmitting and receiving just one message at a time; hence the problems mentioned above regarding separation of simultaneous messages may be moot. Consequently, each user device in the none-preferred protocol transmits and receives on different frequencies, separated by the Doppler shift df.

Following are examples of the base-preferred version.

FIG. 1A is a schematic showing an exemplary embodiment of a mobile user device communicating with a base station, according to some embodiments. As depicted in this non-limiting example, a mobile user device 101 and a base station 102 communicate by exchanging wireless messages 104-105 while the user device 101 is traveling toward the base station 102 as indicated by an arrow 103. The Doppler effect states that the user's message 104, transmitted at a transmission frequency $f_T$, will be received at the base station 102 frequency-shifted to a different frequency $f_R$. If the user device 101 is traveling toward the base station 102, as depicted, then the message 104 is up-shifted, that is, $f_R$ is greater than $f_T$. The base station's message 105 to the user device 101 is also up-shifted in frequency, by the same amount df, when received by the user device 101.

Figure 1B:
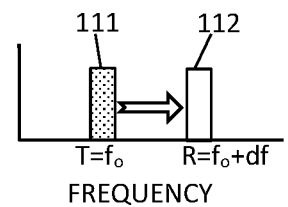
FIG. 1B is a schematic showing an exemplary embodiment of a wireless message frequency distribution, according to some embodiments.

FIG. 1B is a chart showing an exemplary embodiment of a wireless message frequency distribution, according to some embodiments. As depicted in this non-limiting example, a message is shown, as transmitted and as received, versus frequency along the horizontal axis. A transmitted message 111, such as the user device's message 104, is transmitted at a particular "channel" frequency $f_o$, but is received 112 at a Doppler-shifted frequency $f_o+df$. Here and elsewhere, transmitted messages are shown in light stipple while received messages are shown clear, and a hollow arrow indicates which transmitted message corresponds to which received message. The channel frequency $f_o$ may correspond to a particular subcarrier, such as a central subcarrier, in an allocated band of subcarriers. The frequency shift, df, is proportional to the speed of the transmitting entity relative to the receiving entity, and proportional to the channel frequency. To sufficient accuracy, the same value of df may be used for all of the subcarriers employed in a particular message. It is immaterial which entity, transmitting or receiving, is in motion, or if both entities are in motion, since the frequency shift df depends on the relative motion between them.

Figure 1C:
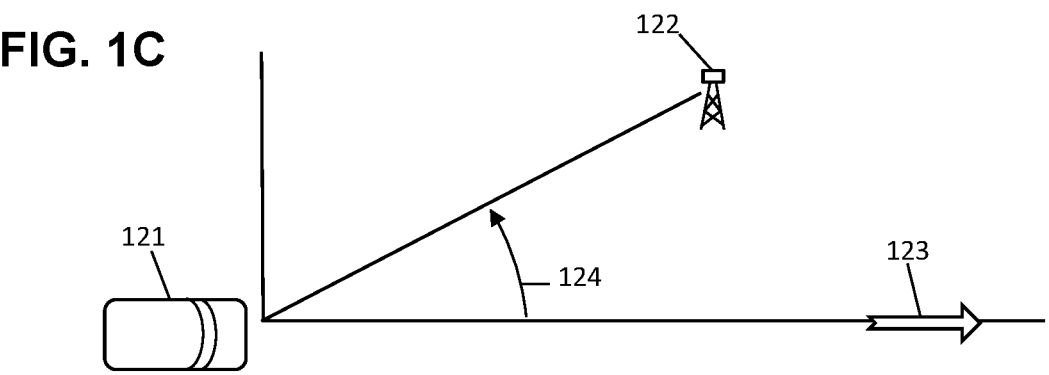
FIG. 1C is a schematic showing an exemplary embodiment of a mobile user device with a base station at an angle, according to some embodiments.

FIG. 1C is a schematic showing an exemplary embodiment of a mobile user device with a base station at an angle, according to some embodiments. As depicted in this non-limiting example, a mobile user device 121, depicted in top view as a vehicle, traveling according to the direction 123, communicates with a fixed receiver 122 such as a base station. The angle 124 between the vehicle's direction 123 and the vector toward the base station 122 is shown. Messages from the mobile user device 121 and the base station 122 are frequency-shifted when received by an amount df, given (to sufficient accuracy) by the following equations:

$$f_R = f_T + df \tag{1}$$

$$df = f_T * (v/c) * \cos(\theta) \tag{2}$$

Here $f_R$ is the frequency at which the message is received, $f_T$ is the frequency at which it is transmitted, df is the Doppler shift, v is the speed of the mobile user device 121 relative to the base station 122, c is the speed of light, and θ is the angle 124 between the user device's direction of travel 123 and the direction of the base station 122. If the mobile user device 121 is traveling away from the base station 122, v is negative and df is negative, and the received frequency is down-shifted. If the mobile user device 121 is traveling perpendicular to the direction of the base station 122, the frequency shift is zero (to sufficient accuracy). Small corrections such as the transverse Doppler effect and higher-order corrections are generally insignificant at terrestrial velocities and are ignored herein. It is generally not necessary that the equality be exact because receivers can usually accommodate small frequency errors. Of concern are frequency shifts sufficient to reduce the noise margin and result in message failures.

Figure 1D:
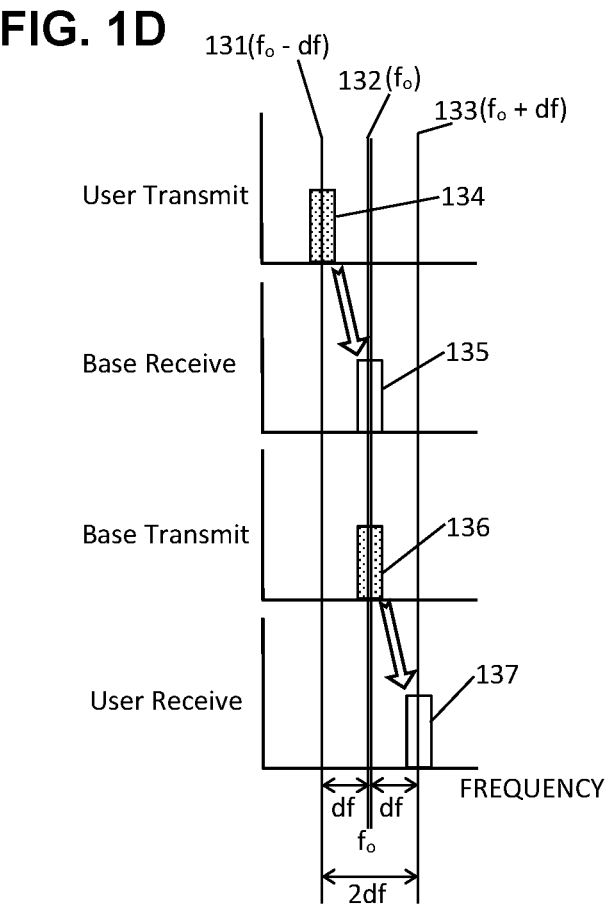
FIG. 1D is a frequency chart showing an exemplary embodiment of a series of messages with Doppler shifting, according to some embodiments.

FIG. 1D is a frequency chart showing an exemplary embodiment of a series of messages with Doppler shifting, according to some embodiments. A frequency chart is a chart with the horizontal axis showing frequency, and one or more messages depicted from various entities. As depicted in this non-limiting example, messages are shown as boxes along a horizontal frequency axis. Transmitted messages are shown in stipple, and received messages are shown clear. A hollow arrow shows which transmitted message corresponds with which received message. Three frequencies are indicated by vertical lines, a channel frequency $f_o$ 132 (double line), a down-shifted frequency $f_o$–df 131, and an up-shifted frequency $f_o$+df 133. Thus the frequency separation between the down-shifted 131 and up-shifted 133 frequencies is 2df as indicated. As mentioned, df is positive if the mobile user device is moving toward the base station, and negative if moving away.

In this "base-preferred" example, the base station transmits and receives messages at the same frequency (the channel frequency $f_o$), and the user device is expected to adjust its transmitter and receiver to correct for any Doppler shifts. The user device can calculate the frequency shift df by determining the location of the base station, its own location, and its own direction and speed. The user device can then transmit uplink messages at a "reverse-shifted" frequency of $f_o$–df, so that the base station will receive the messages Doppler shifted up to the channel frequency of $f_o$. In the figure, the reverse-shifted message 134 is transmitted at $f_o$–df. The message is then received at the base station as 135, frequency shifted up to be substantially equal to the channel frequency of $f_o$ as required by the base station. At a later time, the base station transmits a reply message 136 at frequency $f_o$, which then gets Doppler-shifted up to $f_o$+df when received 137. Thus the base station transmits and receives both messages 135 and 136 at the same frequency $f_o$, while the mobile user device transmits at $f_o$–df and receives at $f_o$+df.

Figure 2A:
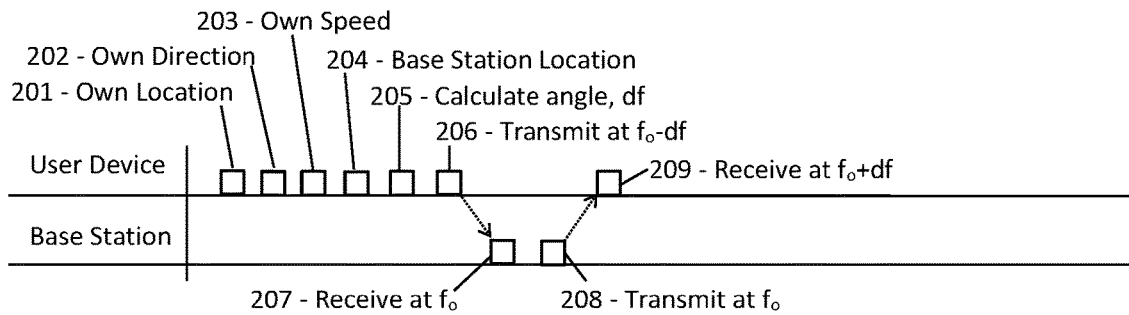
FIG. 2A is a sequence chart showing an exemplary embodiment of a mobile user acquiring data before communicating with a base station, according to some embodiments.

FIG. 2A is a sequence chart showing an exemplary embodiment of a mobile user acquiring data before communicating with a base station, according to some embodiments. A sequence chart is a chart showing a time series of actions by each entity, with time along the horizontal axis. Dotted arrows indicate causation or simultaneity. As depicted in this non-limiting example, a mobile user device prepares for communication with a base station according to the base-preferred version, by determining its own location 201 (using GPS or other satellite system or other location means) and its own direction 202 (using an electronic compass or successive GPS readings, for example) and its own speed 203 (using a speedometer or GPS, for example). Then (if not sooner) the user device determines the location of the base station 204 (using a published database or a prior registration, for example) and calculates 205 the angle of the base station relative to the user device's direction of travel, and thereby determines the Doppler shift df relative to a channel frequency $f_o$ of the base station. The user device then transmits a message 206 to the base station at the "reverse-shifted" frequency of $f_o$–df. The base station then receives the message 207 Doppler-shifted up by df, and therefore received at the channel frequency $f_o$. The base station then sends a reply message 208 at the same frequency $f_o$, and the user device receives it 209 at the Doppler-shifted frequency $f_o$+df. Hence, in this base-preferred example, the base station transmits and receives messages 207-208 at the same frequency, which is the channel frequency $f_o$. The user device, on the other hand, is responsible for calculating df and transmitting at $f_o$–df and then receiving at $f_o$+df.

Figure 2B:
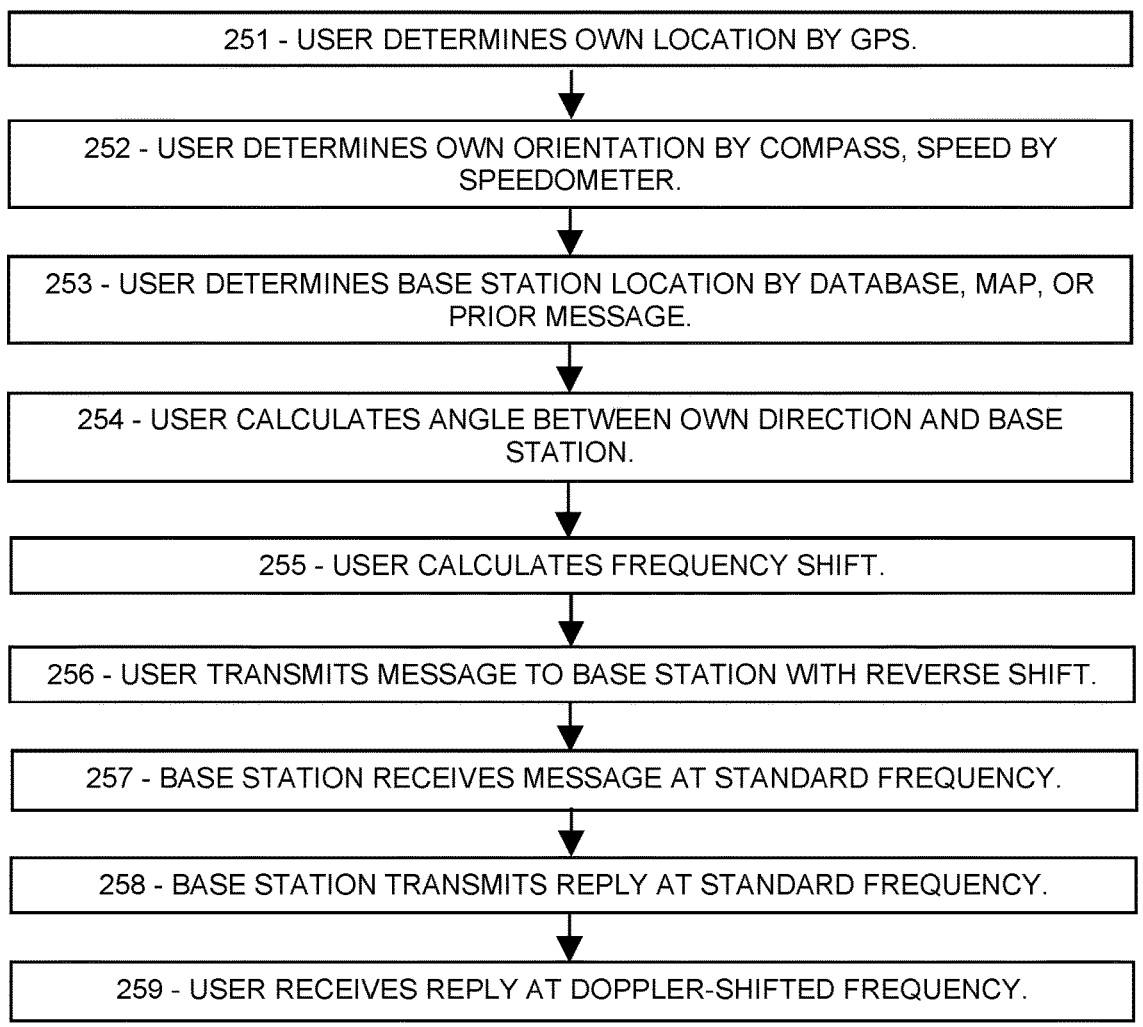
FIG. 2B is a flowchart showing an exemplary embodiment of a procedure for a mobile user device to communicate with a base station, according to some embodiments.

FIG. 2B is a flowchart showing an exemplary embodiment of a procedure for a mobile user device to communicate with a base station, according to some embodiments. As depicted in this non-limiting example, the user device first determines its own location at 251 using, for example, a satellite system or a map or other means, and at 252 reads a compass and speedometer to determine its speed and direction of travel. Then (if not sooner) the user device determines the base station location 253 using, for example, published base station coordinates, or a map, or a previous interaction with the base station, or other means. The user device then 254 calculates the angle between its direction of travel and the vector toward the base station, and thereby calculates 255 a Doppler frequency shift df. At 256, the user device transmits a message to the base station, at a frequency including a reverse-shift (that is, at $f_o$–df) to compensate for the expected frequency shift on the uplink. At 257, the base station receives the message, shifted up to the channel frequency $f_o$ as required for the base-preferred version. Then, at 258, the base station transmits a reply message, also at the channel frequency $f_o$, which the user device receives at 259 shifted up to $f_o$+df.

An advantage of the base station receiving messages at a standard channel frequency $f_o$ may be that the receiver may separate and decode multiple incoming messages simultaneously on separate subcarriers, transmitted by multiple separately-moving user devices, while preserving subcarrier orthogonality and other signal-processing benefits. An advantage of the base station transmitting messages on the same frequency may be that the user device already knows at which frequency to expect the reply message, specifically at $f_o$+df. Another advantage may be that, with the base-preferred version, it may not be necessary for the user device to inform the base station of the user device's motion or location, since the user device is responsible for accommodating both the uplink and downlink frequency shifts.

Another advantage may be that the depicted low-complexity procedures may be compatible with devices that may have difficulty complying with prior-art 5G or 6G registration procedures. Another advantage may be that the depicted procedures of FIG. 1D or 2A or 2B may be implemented as a software (or firmware) update, without requiring new hardware development, and therefore may be implemented at low cost, according to some embodiments. The procedures of FIG. 1D or 2A or 2B may be implemented as a system or apparatus, a method, or instructions in non-transitory computer-readable media for causing a computing environment, such as a user device, a base station, or other signally-coupled component of a wireless network, to implement the procedure. As mentioned, the examples are non-limiting. Other advantages may be apparent to skilled artisans after reading this disclosure. The advantages in this paragraph may apply equally to other examples and lists of advantages provided below.

The systems and methods also include a "mobile-preferred" protocol in which the user device transmits and receives messages at the same frequency. In some embodiments, the base station still receives messages at the channel frequency, and therefore is able to separate multiple simultaneous incoming messages. The base station transmits messages at a "double-reverse-shifted" frequency, $f_o-2df$. Such a pre-correction is well within the capabilities of base stations generally.

Figure 3A:
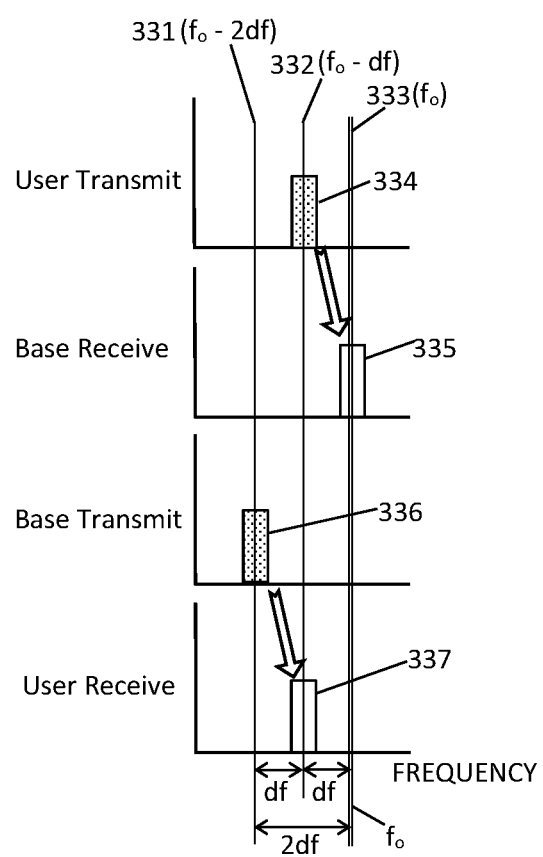
FIG. 3A is a frequency chart showing another exemplary embodiment of messages between a mobile user device and a base station, according to some embodiments.

FIG. 3A is a frequency chart showing another exemplary embodiment of messages between a mobile user device and a base station, according to some embodiments. A user device transmits a message while traveling generally toward a base station, and therefore the message is increased in frequency by the Doppler shift df when received, due to the motion of the user device. As depicted in this non-limiting example, vertical lines indicate the channel frequency 333 $f_o$ (double line), a lower frequency 332 $f_o-df$, and a still lower frequency 331 $f_o-2df$. (Unlike the previous examples, the channel frequency $f_o$ is now shown on the right side of the chart.) In the figure, the user device transmits a message 334 at a reverse-shifted frequency $f_o-df$ so that it will arrive at the base station and be received 335 at the channel frequency $f_o$. The base station then transmits a reply 336 at the channel frequency reduced by twice the Doppler shift, that is, double-reverse-shifted at frequency $f_o-2df$. The reply is then upshifted by df when received 337 by the user device, to the frequency $f_o-df$. Thus the base station receives all messages at the channel frequency $f_o$ as required, and the user device transmits and receives all messages at the same frequency $f_o-df$, as required.

The frequency shifts depicted assume that the user device is traveling generally toward the base station. If instead the user device is traveling away from the base station, the frequency shift is negative, df is a negative number, and therefore the transmitted messages 334 and 336 would be transmitted at frequencies higher than $f_o$ instead of lower to compensate for the Doppler shift.

In addition, the mobile-preferred procedure may include an uplink message in which the user device informs the base station of the motion and location of the user device, so that the base station can calculate the frequency shift df and can transmit the downlink messages accordingly. Alternatively, the user device can indicate the value of the frequency shift df, or the double-reversed-shift of $-2df$, in an uplink message.

Figure 3B:
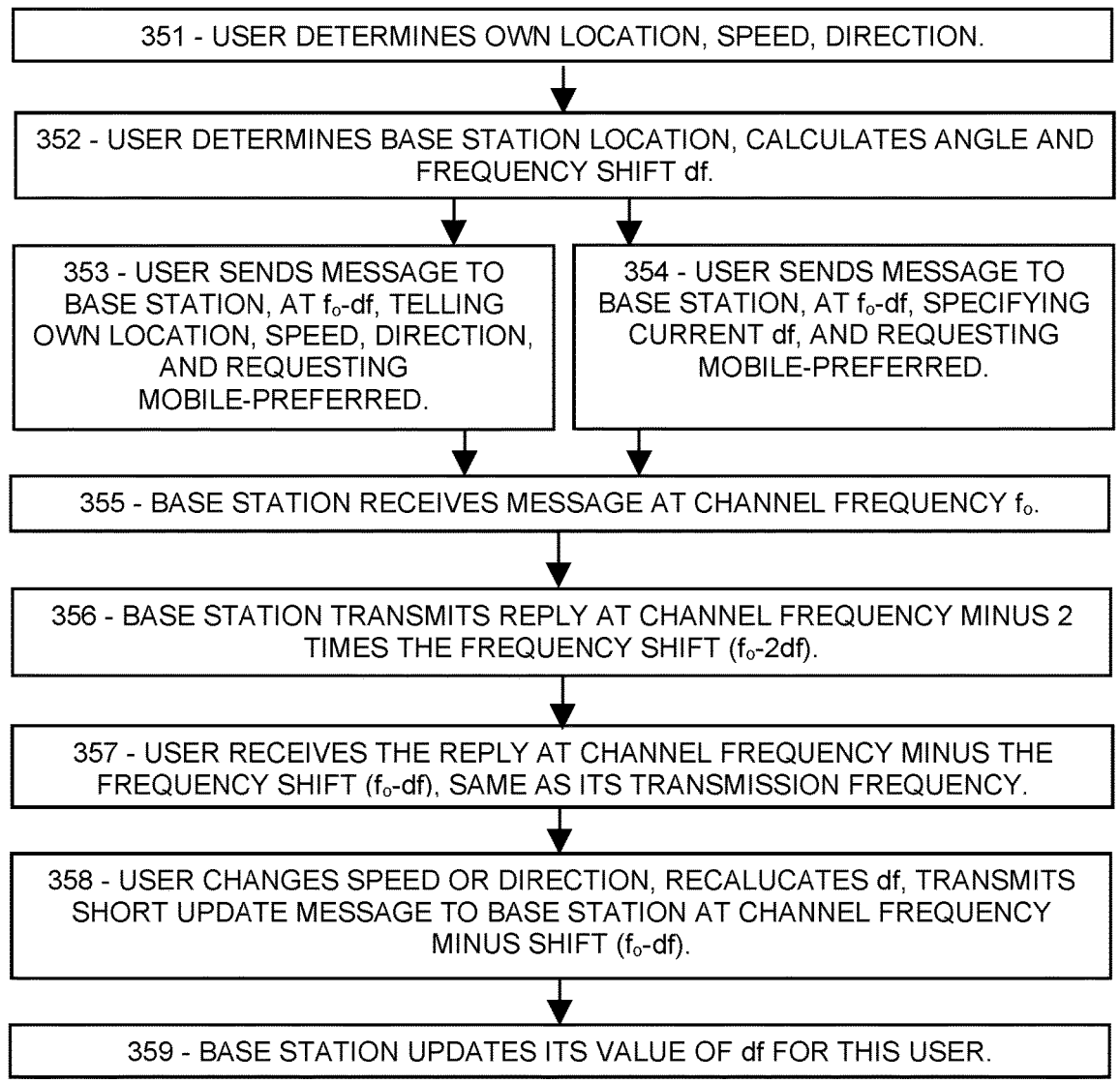
FIG. 3B is a flowchart showing an exemplary embodiment of a procedure for a mobile user device to adjust its transmission frequency, according to some embodiments.

FIG. 3B is a flowchart showing an exemplary embodiment of a procedure for a mobile user device to adjust its transmission frequency, according to some embodiments. As depicted in this non-limiting example, a user device determines its own location, speed, and direction at 351, and determines the location of a base station at 352. The user device then calculates the angle to the base station and determines the df Doppler frequency shift for messages in a particular channel frequency $f_o$. The user device can then send a message to the base station at the reverse-shifted frequency $f_o-df$. In one version, at 353, the user device indicates its own location, speed, and direction, then requests the mobile-preferred protocol in which the user device can transmit and receive on the same frequency. Alternatively, at 354, the user device specifies the value of df and requests the mobile-preferred protocol. In either case, at 355, the base station receives the message at the channel frequency $f_o$ as required, and at 356 replies at the double-reverse-shifted frequency $f_o-2df$. The user device then 357 receives the reply upshifted to the frequency $f_o-df$. Thus the user device transmits and receives messages on the same frequency, as requested. Later, at 358, the user device changes its speed or direction or position relative to the base station, and calculates an updated value of df. The user device then transmits a message to the base station informing the base station of the change, and at 359 the base station records the updated value of df for use in subsequent messages.

Thus the mobile-preferred protocol can provide that the user device transmits and receives messages on the same frequency of $f_o-df$, and that the base station receives messages on the channel frequency of $f_o$. The base station transmits downlink messages on the double-reverse-shifted frequency $f_o-2df$.

In some embodiments, the base station may transmit multiple downlink messages simultaneously to multiple user devices, each message occupying different subcarriers and each message being double-reverse-shifted by a different amount according to each user device's requested df. However, the various user devices may be moving in different directions, and therefore would each have a different Doppler shift for each of the transmitted messages. To assist the user devices in separating the various messages, the base station may provide one or more blank resource elements (such as a blank subcarrier) between the transmitted messages, with no transmission in the blank resource elements, thereby avoiding signals from one message spilling over into an adjacent message. The blank resource elements may also assist the user devices in identifying the beginning and ending of each message, greatly reducing the amount of calculation required of the user devices to receive downlink messages.

The systems and methods further include a "none-preferred" protocol for user devices to communicate with other user devices, without assistance of a base station, such as a sidelink communication. Two embodiments are disclosed, depending on whether messages are transmitted or received on the channel frequency.

Figure 4A:
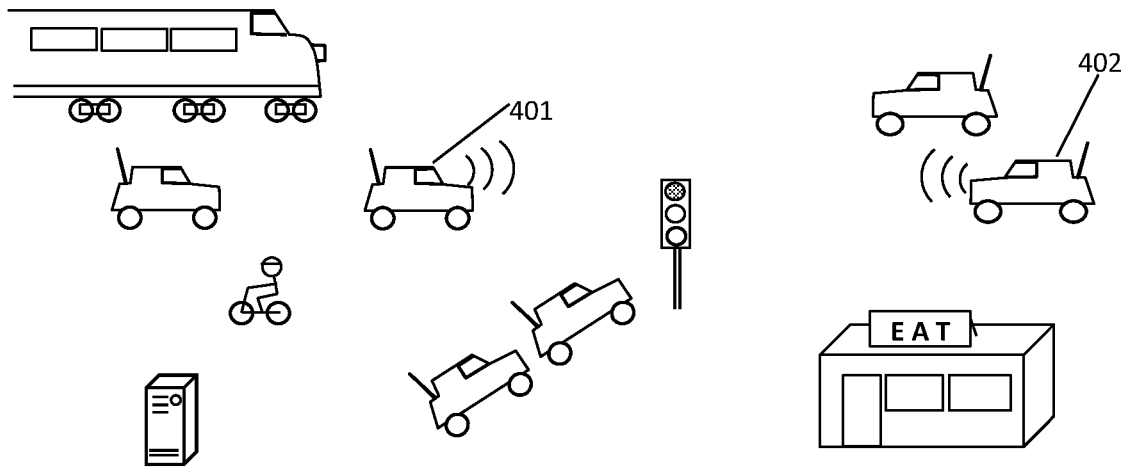
FIG. 4A is a schematic showing an exemplary embodiment of a mobile user device communicating with other mobile and fixed user devices, according to some embodiments.

FIG. 4A is a schematic showing an exemplary embodiment of a mobile user device communicating with other mobile and fixed user devices, according to some embodiments. As depicted in this non-limiting example, a first user device 401 communicates with a second user device 402. In sidelink communications, the first user device 401 may communicate with any of proximate mobile wireless entities traveling at various speeds, such as cars and trucks and trains going in various directions, pedestrians and bicycle riders with mobile phones, plus a wide range of fixed assets such as companies, traffic signals, home computers, and other wireless entities not yet invented. In each sidelink or device-to-device communication, the transmitting and receiving entities may encounter Doppler-shifted messages, at frequencies altered by the relative motion of the transmitter and receiver. In contrast to base station communications, device-to-device communications generally involve receiving just a single message at a time, whereas base stations are generally designed to receive multiple simultaneous messages on slightly different subcarrier frequencies. Consequently, certain communication modes are feasible among peer-to-peer user devices, but may not be feasible for base station communications. In the following, two sidelink communication embodiments are disclosed. In a first embodiment, user devices transmit messages at a reverse-shifted frequency and receive messages at the channel frequency. In a second embodiment, user devices transmit at the channel frequency and receive at the Doppler-shifted frequency.

Figure 4B:
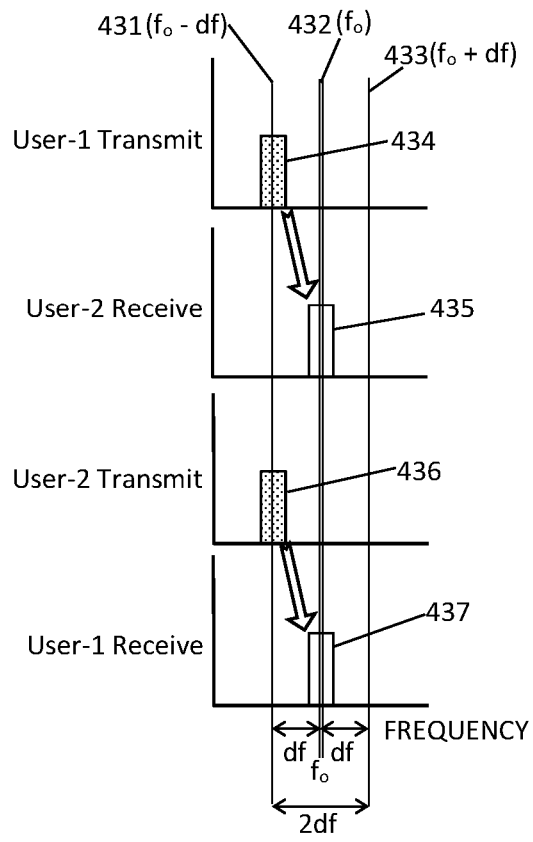
FIG. 4B is a frequency chart showing an exemplary embodiment of messages between two mobile user devices, according to some embodiments.

FIG. 4B is a frequency chart showing an exemplary embodiment of messages between two mobile user devices, according to some embodiments. The user devices have already exchanged messages indicating their speed and location, and have thereby determined the motional frequency shift df. In this case, df is positive (that is, the user devices are approaching each other). As depicted in this non-limiting example, vertical lines indicate the down-shifted frequency 431 $f_o$–df, the channel frequency 432 $f_o$, and the up-shifted frequency 433 $f_o$+df.

User-1 transmits a message 434 to User-2 at the down-shifted frequency 431 of $f_o$–df, which becomes Doppler shifted up to the channel frequency 432 $f_o$ when received 435 by User-2. Then, User-2 transmits a reply 436 in the same way, transmitting at the down-shifted frequency 431 $f_o$–df, which User-1 receives 437 at the channel frequency 432 $f_o$. Thus both user devices transmit at the reverse-shifted frequency of $f_o$–df and receive at the channel frequency of $f_o$. Since both of the user devices transmits at a different frequency than it receives, the version is "none-preferred" as used herein.

If either user device changes course, it may transmit an updated value of df to the other one, or else an updated indication of the speed and location. Alternatively, a first user device may determine that the frequency of a message received from a second user device is not equal to the expected value of $f_o$. This likely indicates that the second user device has changed speed or direction. The first user device may therefore transmit a frequency correction request to the second user device. The frequency correction request may be transmitted as a separate message, or it may be appended to another message to the second user device.

An advantage of the depicted procedure may be that each user device may receive messages at a predetermined frequency, such as the channel frequency $f_o$, despite their relative motion, thereby enabling message demodulation at a predetermined frequency without applying frequency corrections before demodulating.

Figure 4C:
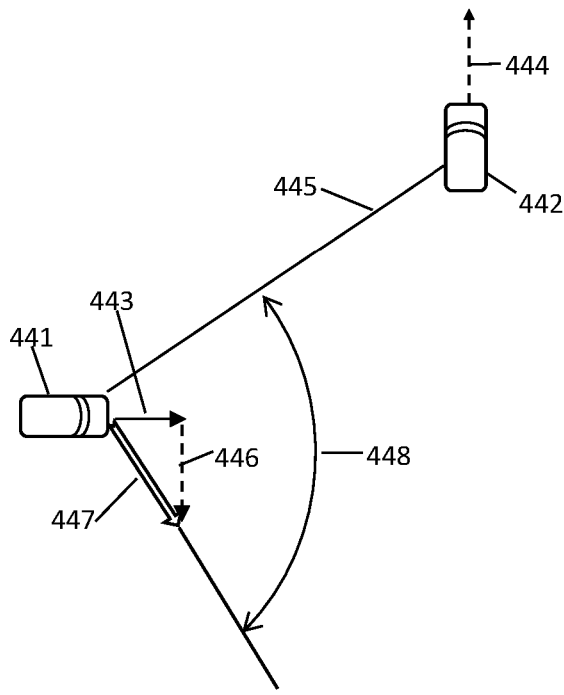
FIG. 4C is a schematic showing an exemplary embodiment of two mobile user devices traveling in different directions, according to some embodiments.

FIG. 4C is a schematic showing an exemplary embodiment of two mobile user devices traveling in different directions, according to some embodiments. As depicted in this non-limiting example, two mobile user devices can calculate a resultant frequency shift due to the Doppler effect, according to the locations, speeds, and directions of the two user devices. In contrast to FIG. 1C, in this case both entitles are in motion, and therefore a suitable calculation is required to determine the frequency shift df. A first mobile user device 441 and a second mobile user device 442, depicted as vehicles in top view, are in motion. The first user device 441 has a first velocity indicated by a first solid arrow 443, and the second user device 442 has a second velocity indicated by a dashed arrow 444. Each velocity 443-444 is represented as a vector with a magnitude equal to the associated speed and an orientation equal to the associated direction. The line 445 between the two user devices 441-442 indicates their relative locations.

To calculate the Doppler shift for such motions, the first user device 441 can determine its own location, speed, and direction, and can receive a message from the second user device 442 indicating the second user device's location, speed, and direction. The first user device 441 can then determine the line 445 according to the difference between the locations of the two user devices 441-442. The first user device 441 can also determine its own velocity 443 according to its speed and direction, and the second user device's velocity 444 according to the second user device's speed and direction. The first user device 441 can then determine the angle θ 448 using vector subtraction. Specifically, the first user device 441 can vectorially subtract the second user device's velocity 444 from its own velocity 443. Alternatively, and equivalently, the first user device 441 can add a vector 446, equal in magnitude to the second user device's velocity 444 but opposite in direction, to the first user device's velocity 443. In either case, the resultant velocity 447 is indicated by a hollow arrow. The angle θ 448 is then the angle between the resultant velocity 447 and the line 445 between the two user devices 441-442. The formulas given in Eq. 1 and 2 can then be used to determine the Doppler shift df, to sufficient accuracy, in which v represents the magnitude of the resultant velocity 447, and θ represents the angle between the resultant velocity 447 and the line 445 between the two user devices 441-442.

The second user device 442 can perform an equivalent calculation from its perspective, by vectorially subtracting the first user device's velocity vector 443 from its own velocity vector 444 to obtain a resultant velocity vector, setting v equal to the magnitude of that resultant vector, calculate θ from the direction, and determine the same Doppler shift (to sufficient accuracy) as determined by the first user device 441.

The case of FIG. 1C, involving a mobile user device and a base station, is a special case of the vector calculation, in which the velocity of the second entity is zero.

Figure 4D:
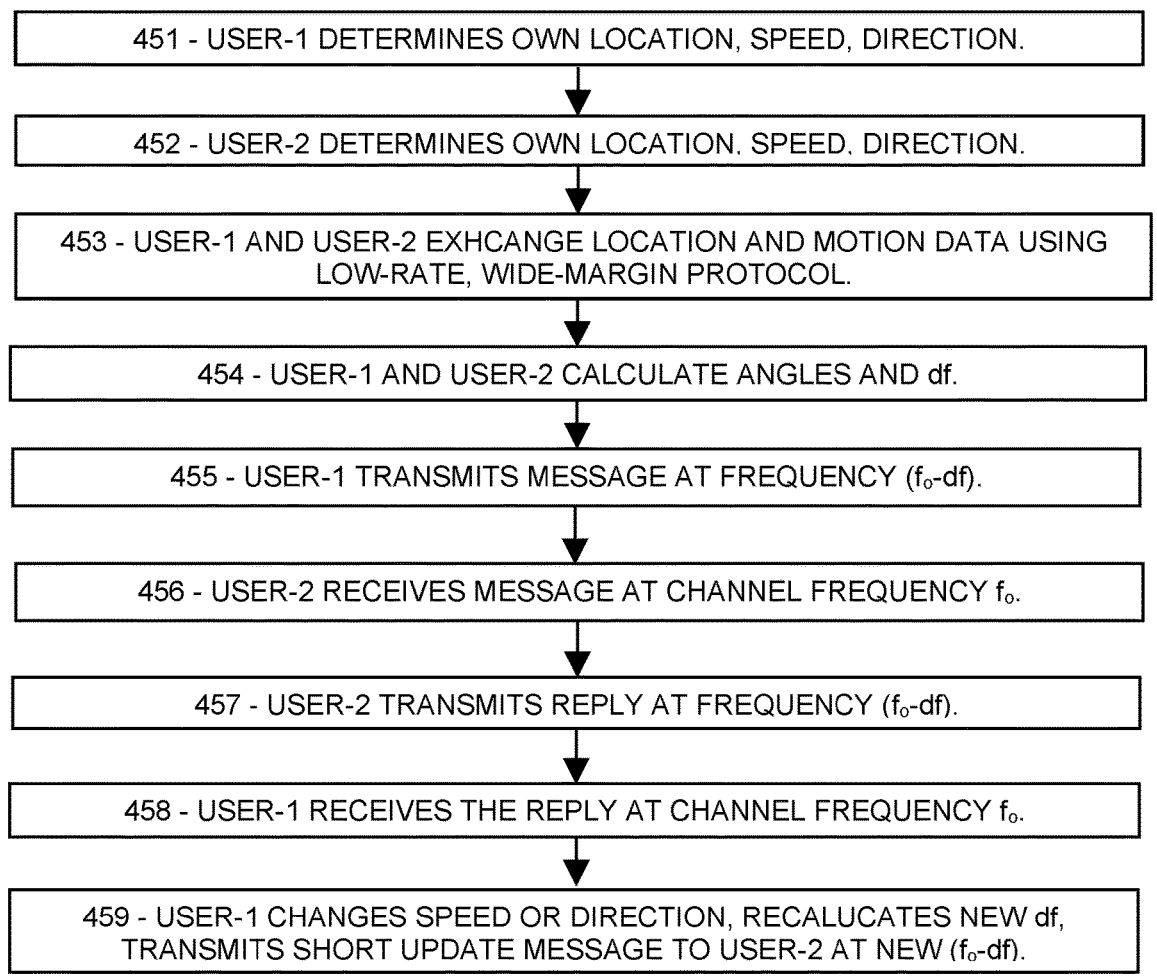
FIG. 4D is a flowchart showing an exemplary embodiment of a procedure for a mobile user devices to adjust their transmission frequencies, according to some embodiments.

FIG. 4D is a flowchart showing an exemplary embodiment of a procedure for mobile user devices to adjust their transmission frequencies, according to some embodiments. The example is of the "none-preferred" version in which peer devices receive messages at a predetermined frequency such as $f_o$. As depicted in this non-limiting example, at 451, a mobile User-1 determines its own location, speed, and direction using, for example, GPS, a speedometer, and an electronic compass. At 452, mobile User-2 does the same. At 453, the two mobile devices exchange messages indicating their location, speed, and direction data. Since these initial messages are transmitted before knowing what frequency shifts to expect, these messages may be transmitted using suitable wide-margin parameters, such as a low data rate transmission with wide frequency acceptance. At 454, the two user devices each calculates the frequency shift df due to their relative motion. At 455, User-1 transmits a message at a reverse-shifted frequency of $f_o$–df. At 456, User-2 receives the message, Doppler shifted to the channel frequency of $f_o$. At 457, User-2 transmits a reply message to User-1, at the reverse-shifted frequency $f_o$–df, which User-1 receives 458 at $f_o$. At 459, User-1 has changed its speed or direction or location relative to User-2, and therefore recalculates the frequency shift df. The calculation may take into account the change in location of User-2 due to its velocity as reported in the previous message exchange. Thus the calculated df frequency shift may include the extrapolated location of the other user device assuming, for example, that the speed and direction of the other entity have remained constant for the elapsed time. User-1 then transmits a message to User-2, informing User-2 of the new value of df. As a further alternative, User-1 may transmit its own revised location and motion values so that User-2 can calculate df. In either case, the update message is transmitted using the updated value of df, so that User-2 can receive it at the channel frequency $f_o$.

An advantage of sidelink communications with messages transmitted on a reverse-shifted frequency $f_o$–df, as described in FIGS. 4B and 4C, may be that the messages can be received by both entities at a known and expected frequency $f_o$. Receiving messages at a predetermined frequency may simplify decoding of the messages, especially if the message is frequency-spanning (occupying multiple subcarriers at a single symbol time) and especially if the receiving user device is a reduced-capability device. In addition, each user device may broadcast messages indicating its location, direction, and speed so that other user devices can calculate df accordingly before communicating with it.

Figure 5A:
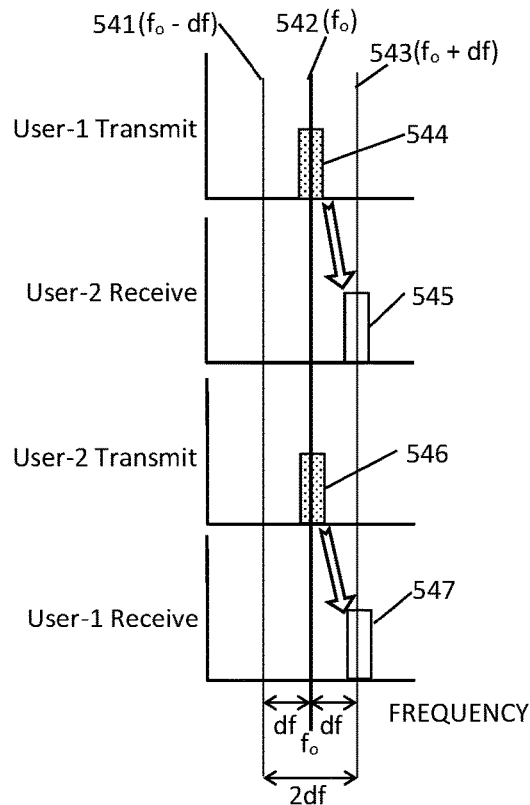
FIG. 5A is a frequency chart showing an exemplary embodiment of messages transmitted at a channel frequency between two mobile user devices, according to some embodiments.

FIG. 5A is a frequency chart showing an exemplary embodiment of communication between two mobile user devices, each transmission at the channel frequency, according to some embodiments. This is another example of the none-preferred version, but now with user devices transmitting at $f_o$ and receiving at $f_o+df$. Vertical lines show the channel frequency 542 $f_o$, and the up-shifted and down-shifted frequencies 543 and 541 respectively. The channel frequency $f_o$ is in the middle of the chart. As depicted in this non-limiting example, User-1 and User-2 both transmit messages at the channel frequency, and both receive messages at the Doppler-shifted frequency.

First, User-1 transmits a message 544 to User-2 at the channel frequency $f_o$, which User-2 then receives 545 at $f_o+df$ due to the relative motion between the two entities. User-2 transmits a reply message 546, also at frequency $f_o$, and User-1 receives it 547 at frequency $f_o+df$. Thus both entities transmit on the channel frequency and receive at the Doppler-shifted frequency due to the relative motion.

To assist in decoding each received message, the user devices may have already exchanged previous messages indicating their locations, speeds, and directions. Each user device may have thereby calculated the frequency shift df, and therefore may be prepared to receive each incoming message at the expected frequency of $f_o+df$. Alternatively, each user device may determine the frequency of each incoming message according to components of the message, as explained later.

Figure 5B:
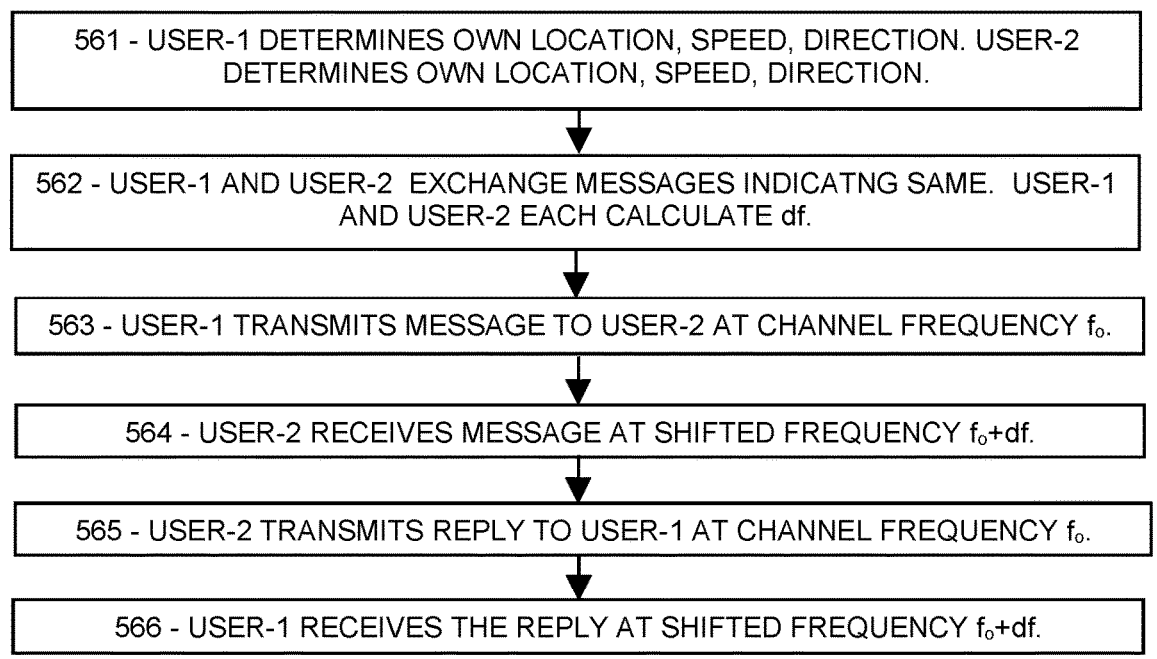
FIG. 5B is a flowchart showing an exemplary embodiment of a procedure for mobile user devices to transmit messages at a channel frequency, according to some embodiments.

FIG. 5B is a flowchart showing an exemplary embodiment of a procedure for mobile user devices to transmit and receive messages at different frequencies, according to some embodiments. As depicted in this non-limiting example, two user devices transmit messages at the sidelink channel frequency $f_o$ and receive at the Doppler-shifted frequency $f_o+df$.

At 561 User-1 and User-2 each determine their own locations, speeds, and directions, and then at 562 they transmit this information to each other. Alternatively, each user device may broadcast the information so that other proximate user devices may also receive the information. User-1 and User-2 then calculate the relative velocity, angles, and frequency shift df relative to a common sidelink channel frequency $f_o$. At 563, User-1 transmits a message to User-2 at the channel frequency $f_o$. User-2 receives the message at 564 at the Doppler-shifted frequency of $f_o+df$ and decodes it using the value of df calculated previously. Then at 565, User-2 transmits a reply to User-1 at the channel frequency $f_o$. At 566, User-1 receives the reply at $f_o+df$. Thus both user devices transmitted their messages at the channel frequency and received messages frequency-shifted by df, as expected.

The systems and methods further include message formats for communications between mobile user devices and base stations, and for sidelink communications between user devices, as disclosed in the following.

Figure 6A:
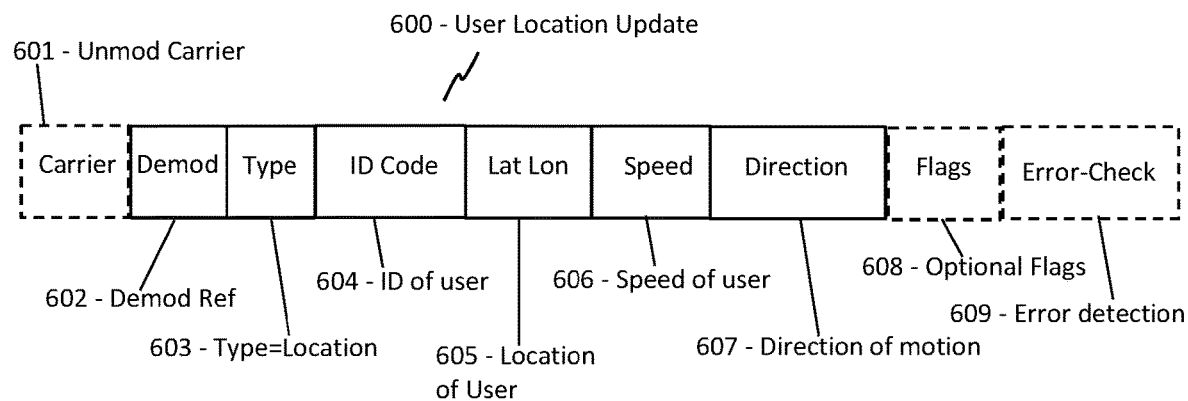
FIG. 6A is a schematic showing an exemplary embodiment of a user location message, according to some embodiments.

FIG. 6A is a schematic showing an exemplary embodiment of a user location update message, according to some embodiments. According to this non-limiting example, a user location update message 600 may be transmitted by a mobile user device to a base station, to inform the base station of changes in the location or motion of the user device. The message 600 may include an optional field of unmodulated carrier signal 601, a demodulation reference 602, a message-type field 603 indicating the type of message (specifically, that the message includes the location and motion of a mobile user device), an identification field 604 including an address or identification code of the transmitting user device, a location field 605 indicating the coordinates, such as latitude and longitude, of the transmitting user device, a speed field 606 and a direction field 607 indicating the motion of the user device, an optional flags field 608 containing one or more parameters conveying additional information, and an optional error-check field 609 with a parity or CRC or other value configured to reveal message faults.

In some embodiments, the unmodulated carrier field 601 may be one or more resource elements with the carrier sine wave at the subcarrier frequency but otherwise unmodulated, thereby enabling a receiver to determine the frequency of the message. The demodulation reference 602 may exhibit certain levels, such as amplitude and/or phase levels, of the modulation scheme that the rest of the message is modulated in, so that the receiver can compare the amplitude and/or phase of each of the message elements to the exhibited levels (or to other levels derived from the exhibited levels) to demodulate the message. For example, the demodulation reference 602 may include two reference elements which are modulated to specifically exhibit the maximum amplitude level of the modulation scheme, the minimum amplitude level, and the maximum and minimum phase levels. The receiver can then calculate the intervening amplitude and phase states (if any) of the modulation scheme by interpolation between the exhibited maximum and minimum levels. The receiver can then demodulate each of the message elements by comparing the amplitude and phase values of each message element to the amplitude and phase levels of the modulation scheme, including those exhibited in the demodulation reference 602 and those derived by calculation. The receiver may thereby determine the modulation state of each message element, thus demodulating it.

The message-type field 603 may indicate that the message is a location update with predetermined fields as shown. The address or identification field 604 may indicate, to the base station, which user device is providing the updated information. The location field 605 may include the latitude and longitude of the user device, or a code related to same, or other location indicator understandable to the base station. For example, if the location is in degrees and degree fractions, it may not be necessary to include the whole-degree part because one degree corresponds to about 100 km over most of the planet, which is much larger than most wireless cells. To save time and resources, the coordinates may be truncated, such as including the decimal portion but not the whole-degree portion of the latitude and longitude. Alternatively, the first digit after the decimal point may be omitted for the same reason. Alternatively, the locations may be provided in the degree-minute-second format with, optionally, the whole-degree and minute portions omitted. Further compactification of the location data may be possible, depending on the size of the region administered by the base station and the spatial resolution required.

The speed and direction fields 606-607 may indicate how the user device is moving, relative to a geographical direction such as north. For example, the user device may include a speedometer indicating the speed, and an electronic compass or gyro-compass indicating the direction of north. Alternatively, the user device may determine its geographical heading by comparing subsequent location values from GPS or other satellite system. As an option, if the user device knows the location of the base station (from a network database, for example), the message may include an indication of the angle between the user device's motion and the vector toward the base station. The speed field 606 may be provided according to the speed of the user device relative to the ground. Alternatively, the speed field may indicate the rate of change of the distance between the user device and the base station (that is, the velocity component along the vector toward the base station), since frequency shifts are generally proportional to that component. The optional flags 608 may indicate additional information, such as whether the user device is a reduced-capability device, or whether the user device requests another accommodation, for example. The error-check field 609 may include a parity check or a CRC code or other measure of message faulting.

An advantage of the user location update message 600 may be that the base station may adjust its frequency shift value df to match the current motion and location of the user device, and may thereby improve the reliability of demodulating subsequent messages transmitted from the user device to the base station, and may also improve the reliability of messages transmitted from the base station to the user device.

Figure 6B:
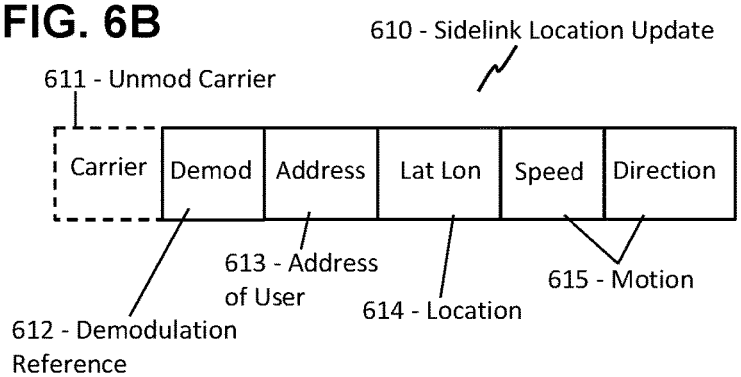
FIG. 6B is a schematic showing an exemplary embodiment of a sidelink location message, according to some embodiments.

FIG. 6B is a schematic showing an exemplary embodiment of a sidelink location message, according to some embodiments. According to this non-limiting example, the message 610 may be transmitted by a user device to other user devices in a D2D or V2V or X2X communication, to inform other user devices of the updated location and motion of the transmitting user device. The message 610 may include an optional (in dash) carrier field 611 of unmodulated carrier signal, a demodulation reference 612, an address field 613 indicating the wireless address code of the user device, a location field 614 indicating the geographic coordinates of the user device, and speed and direction fields 615 specifying the motion of the user device.

In some embodiments, the carrier field 611 may include unmodulated carrier sine waves by which a receiving user device may determine the frequency of the arriving message, including any Doppler shifts, and may thereby configure the receiver to match that frequency before attempting to process the rest of the message. The demodulation reference 612 may be a short-form demodulation reference exhibiting the maximum and minimum amplitude and phase levels of the modulation scheme, or other predetermined levels of the modulation scheme, and the receiver can calculate any remaining amplitude and phase levels of the modulation scheme by interpolation. The receiver can then demodulate the message elements by comparing the amplitude and phase values of the message elements to the amplitude and phase levels exhibited in the modulation reference 612, or those derived therefrom, to determine the modulation state of each message element.

The address field 613 may indicate the wireless address or identification code of the transmitting user device. The location field 614 may include the geographical coordinates, or values derived from them, sufficient to indicate the position of the transmitting user device at the time of transmission. The speed and direction fields, collectively 615, may indicate the current motion of the transmitting user device, so the receiving user devices may input this information into their collision-avoidance systems and thereby avoid traffic collisions. In addition, the receiving user devices can adjust the frequency of subsequent messages to this user device to account for the frequency shift caused by the relative motion between them.

An advantage of a user device broadcasting a message indicating its current position, speed, and direction may be to enable other user devices to calculate the Doppler shift df, and thereby improve their processing of messages from the transmitting user device, and also to adjust frequencies and other parameters of future messages to that user device.

Figure 7A:
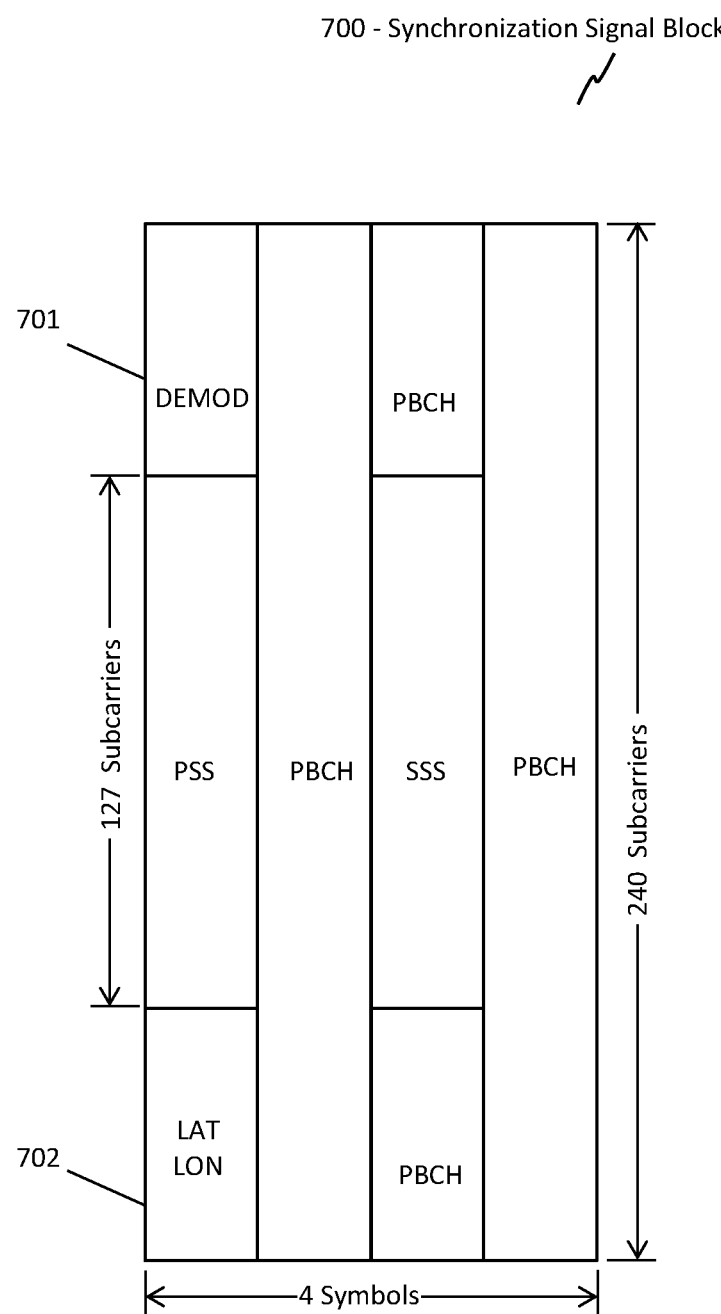
FIG. 7A is a schematic showing an exemplary embodiment of a message format for base stations to indicate locations to user devices, according to some embodiments.

FIG. 7A is a schematic showing an exemplary embodiment of a message format for a base station to indicate its location to user devices, according to some embodiments. As depicted in this non-limiting example, a modified SSB (synchronization signal block) 700 in 5G/6G includes 4 symbol times and 240 consecutive subcarriers, all modulated in QPSK. Within the message 700 are a PSS (primary synchronization signal) of 127 subcarriers, a SSS (secondary synchronization signal) also 127 subcarriers, and four regions with PBCH (physical broadcast channel) which, in this context, includes the MIB (master information block). The PSS, SSS, and PBCH(MIB) provide system information that a user device may require, in order to receive messages on a particular cell. The remaining two regions, indicated as 701 and 702, are unassigned in 5G/6G.

In the depicted embodiment, a demodulation reference is inserted into the first unassigned region 701, to assist user devices in demodulating the rest of the message, and a location is inserted into the second unassigned region 702, indicating the latitude and longitude of the base station (or the antenna of the base station). The full geographical location of the base station may include eight digits for each of the latitude and longitude in decimal degrees, for example, thereby providing about one-meter resolution. The number of bits needed for this resolution is about 53 or 54 depending on encoding, or 27 resource elements at QPSK. Thus the full geographical coordinates can fit within the second region 702, which includes 56 or 57 subcarriers. Thus the base station can indicate, in its SSB message, its location at meter-scale resolution, with no increase in the bandwidth required, and no increase in the time required, for the message.

Figure 7B:
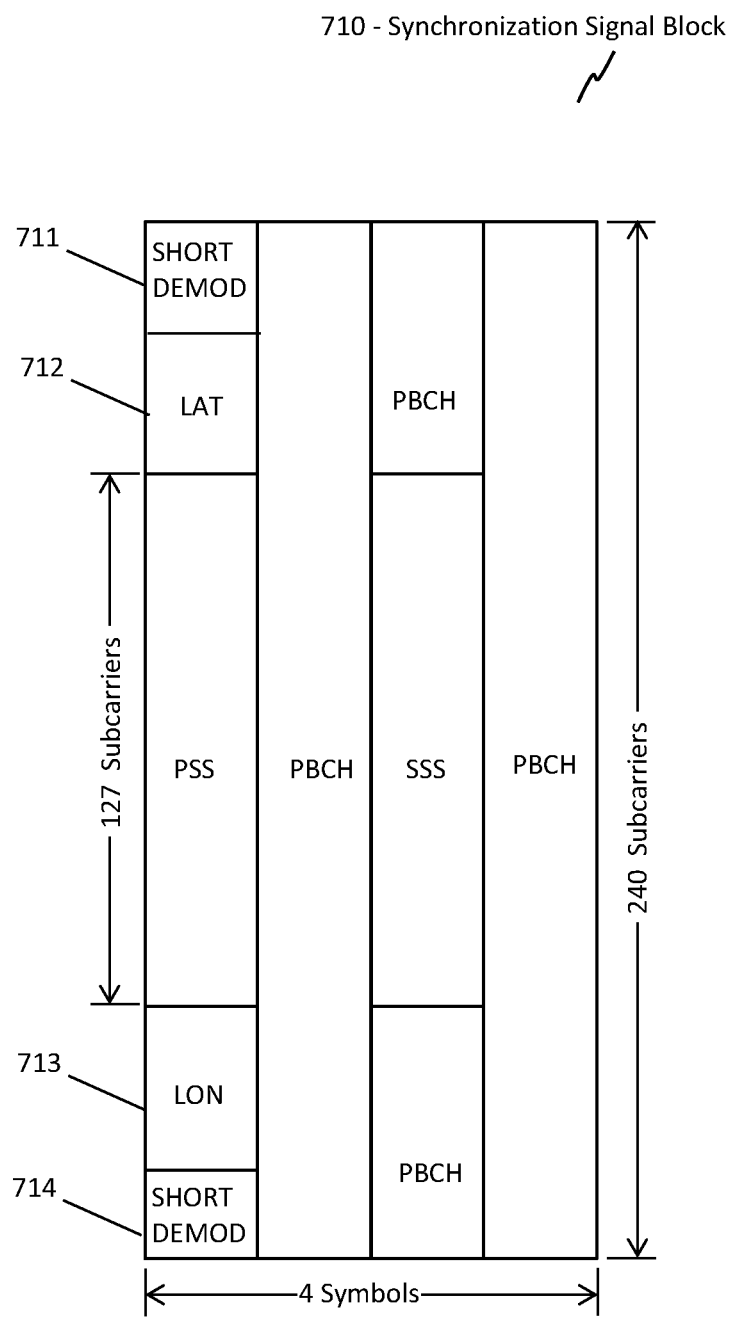
FIG. 7B is a schematic showing another exemplary embodiment of a message format for base stations to indicate locations to user devices, according to some embodiments.

FIG. 7B is a schematic showing another exemplary embodiment of a message format for base stations to indicate locations to user devices, according to some embodiments. As depicted in this non-limiting example, another modified SSB message 710 may include the usual PSS-SSS-PBCH(MIB) structure, plus four new items in the previously unallocated fields of the first symbol time. The modified SSB message 710 may include a short-form demodulation reference 711, shown in the four highest-frequency subcarriers, followed by the latitude value 712. After the PSS, the longitude value 713 is shown followed by another short-form demodulation reference 714 in the lowest-frequency subcarriers. Each of the short-form demodulation references 711 and 714 is four consecutive reference elements of the message 710, modulated according to all four values of the phase used in the modulation scheme. (There is no amplitude modulation in QPSK). By providing the short-form demodulation references at the highest and lowest frequency subcarriers, within the message body 710, the rest of the message may be demodulated despite interference and noise. For example, each element of the message 700 may be compared to an interpolated, or weighted average, of the modulation levels exhibited in the short-format demodulation references 711 and 714. Since the demodulation references 711 and 714 are generally affected by noise and interference in the same way as the rest of the message, each message element may be demodulated according to the interpolated average of the two demodulation references 711 and 714, thereby mitigating the noise and interference including frequency-dependent noise and interference, according to some embodiments.

As another option, the location data may be included in or appended to the PBCH by declaring a new format that includes the latitude and longitude of the base station.

As a further example, the location information may be included with or appended to an SIB1 message, which is a message broadcast periodically by the base station indicating how new users can transmit messages to the base station. By receiving the SSB or the SIB1 message modified to include the base station's latitude and longitude, new user devices can thereby determine the location of the base station.

Figure 7C:
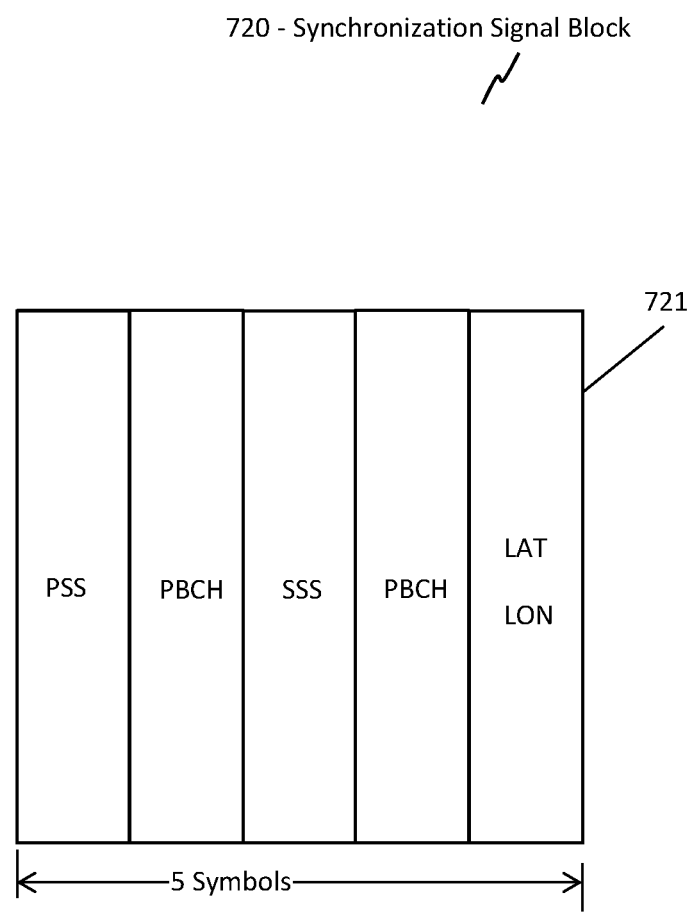
FIG. 7C is a schematic showing an exemplary embodiment of a low-complexity message format for base stations to indicate locations to user devices, according to some embodiments.

FIG. 7C is a schematic showing an exemplary embodiment of a low-complexity message format for a base station to indicate its location to user devices, according to some embodiments. As depicted in this non-limiting example, in a low-complexity SSB message 720, the bandwidth may be reduced to that required for transmitting the PSS and SSS portions, and the size of the BPCH portions may be reduced by reducing the number and complexity of parameters, and a fifth symbol 721 may be added. The fifth symbol 721 may contain the latitude and longitude, and optionally other data, of the base station.

Alternatively, the location data may be included in the PBCH, and a fifth symbol may be added to accommodate the PBCH with the location data included.

An advantage of providing the base station location in the SSB message may be to inform each new arrival user device of the base station's location before the user device attempts to acquire further system information and begin transmitting to the base station. An advantage of placing two short-form demodulation references at the top and bottom subcarriers may be that frequency-dependent interference and external noise can be mitigated by comparing the phase of each message element to the two short-form demodulation references 711 and 714 or to an interpolated average of the corresponding phase values. An advantage of informing user devices of the base station's location may be that the user devices can then adjust their transmit power for satisfactory reception at the base station without a power scan. An advantage of including the base station's location information in an SIB1 message instead of the SSB message may be that the SSB message may remain unmodified.

5G, and especially 6G, have enormous potential for communications between mobile user devices and other entities, such as base stations, vehicles in traffic, roadside devices, and innumerable other applications for low-cost wireless communication. The systems and methods disclosed herein are intended to provide means for user devices in motion to mitigate effects of frequency shifts caused by the Doppler effect, the upshift or downshift in frequency resulting from relative motion between the transmitting and receiving entity. Each user device may determine its own location, speed, and direction of travel, as well as the location and other parameters of the intended recipient. The user device can calculate a frequency shift due to the relative motion, and can compensate for that frequency shift in transmissions or receptions or both. In communications between a mobile user device and a base station, uplink messages may be configured to arrive at the base station at a predetermined channel frequency $f_o$, while downlink messages may be configured to simplify the signal processing required of user devices to decode the message. In sidelink communications, mobile user devices may communicate with other mobile or fixed entities while providing that each message is received at a predetermined channel frequency. These protocols may thereby provide readily applicable solutions to longstanding limitations of communications with mobile devices, and may thereby enable many wireless applications with mobile devices that would be unfeasible, absent the systems and methods disclosed herein.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touch-screen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file-storing medium. The outputs may be delivered to a user by way of signals transmitted to robot steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A method for a mobile user device to communicate with a base station of a wireless network, the method comprising:
   determining, by the mobile user device, a location of the base station, a location of the mobile user device using a satellite-based navigation system, a speed of the mobile user device using a speedometer mounted in or on the mobile user device, and a direction of travel of the mobile user device using an electronic compass mounted in or on the mobile user device;
   determining, by the mobile user device, a channel frequency associated with the base station;
   calculating, by the mobile user device, a Doppler frequency shift associated with wireless communication between the mobile user device and the base station, the Doppler frequency shift being proportional to the channel frequency and proportional to the speed of the mobile user device and proportional to a cosine of an angle between the direction of travel of the mobile user device and a direction toward the base station from the mobile user device; and
   transmitting, by the mobile user device, to the base station, a first wireless message at a first frequency.

2. The method of claim 1, wherein the message is transmitted according to 5G technology.

3. The method of claim 1, wherein the first frequency is configured so that the first message is received, by the base station, at the channel frequency.

4. The method of claim 1, wherein the first frequency is substantially equal to the channel frequency minus the Doppler frequency shift, wherein "substantially equal" refers to being "equal to within a predetermined fraction of the Doppler frequency shift", and wherein the predetermined fraction is in the list of 1%, 5%, 10%, and 20%.

5. The method of claim 1, further comprising receiving, by the mobile user device, from the base station, a second message at a second frequency substantially equal to the first frequency or to the channel frequency plus the Doppler frequency shift.

6. The method of claim 1, further comprising receiving, by the mobile user device, from the base station, a second message at a second frequency substantially equal to the first frequency plus twice the Doppler frequency shift.

7. The method of claim 1, further comprising receiving, by the mobile user device, information from a publicly accessible database of network properties, the information including the location of the base station.

8. The method of claim 1, further comprising:
   transmitting, by the mobile user device, to the base station, a third message specifying the location, speed, and direction of travel of the mobile user device.

9. The method of claim 8, wherein the third message further includes a demodulation reference, a message-type code indicating that the third message includes the location, speed, and direction of travel of the mobile user device, and an identification code of the mobile user device.

10. The method of claim 9, wherein the third message further includes an interval of unmodulated carrier signal.

11. A base station of a wireless network, in signal communication with a mobile user device, the base station configured to:
   determine a channel frequency related to a channel of the base station;
   determine a frequency shift related to a motion of the mobile user device, wherein the frequency shift is based at least in part on the speed of the mobile user device, the speed of the mobile user device determined using a speedometer mounted in or on the mobile user device the direction of travel of the mobile user device, wherein the direction of travel of the mobile user device is determined using an electronic compass mounted in or on the mobile user device, and the location of the mobile user device relative to a location of the base station, wherein the location of the mobile user device is determined using a satellite-based navigation system;
   receive a first message, from the mobile user device, at the channel frequency; and
   transmit a second message, to the mobile user device, at the channel frequency minus two times the frequency shift.

12. The base station of claim 11, further configured to:
   receive a third message, from the mobile user device, specifying the location, the speed, and the direction of travel of the mobile user device.

13. The base station of claim 11, further configured to receive, from the mobile user device, a fourth message specifying the frequency shift.

14. The base station of claim 13, wherein the channel frequency is related to one or more subcarriers in which the mobile user device has permission to transmit the fourth message.

15. A method for a first mobile user device to communicate with a second mobile user device, the method comprising:
   determining, by the first mobile user device, a sidelink channel frequency allocated for wireless communication between user devices;
   determining, by the first mobile user device, a location, a speed, and a direction of travel of the first mobile user device, the location of the first mobile user device determined using a satellite-based navigation system, the speed of the first mobile user device determined using a speedometer mounted in or on the mobile user device, and the direction of travel of the first mobile user device determined using an electronic compass mounted in or on the mobile user device;
   receiving, by the first mobile user device, from the second user device, a message specifying a location, a speed, and a direction of travel of the second mobile user device;
   calculating, by the first mobile user device, based at least in part on the location, speed, and direction of travel of the second mobile user device, a frequency shift proportional to the sidelink channel frequency.

16. The method of claim 15, further comprising:
transmitting, by the first mobile user device, to the second mobile user device, a first message at the channel frequency; and
receiving, by the first mobile user device, from the second mobile user device, a second message at the sidelink channel frequency plus the frequency shift.

17. The method of claim 15, further comprising:
transmitting, by the first mobile user device, to the second mobile user device, a first message at the channel frequency minus the frequency shift; and
receiving, by the first mobile user device, from the second mobile user device, a second message at the sidelink channel frequency.

18. The method of claim 15, wherein the message comprises:
an interval of no transmission or of unmodulated carrier signal;
a demodulation reference exhibiting a maximum amplitude level, a minimum amplitude level, a maximum phase level, and a minimum phase level of a modulation scheme; and
an error-check field configured to reveal message faults.

* * * * *